May 12, 1936.  J. J. GUEST  2,040,738

COMPENSATING MECHANISM FOR BALANCING MACHINES

Filed Dec. 21, 1932

WITNESSES. E. Antrobus
J. M. Hardy.

INVENTOR
James J. Guest

Patented May 12, 1936

2,040,738

UNITED STATES PATENT OFFICE 2,040,738

COMPENSATING MECHANISM FOR BALANCING MACHINES

James John Guest, Abbey Wood, England

Application December 21, 1932, Serial No. 648,153
In Great Britain December 21, 1931

6 Claims. (Cl. 73—51)

This invention relates to apparatus for determining the adjustments necessary for balancing bodies which are to rotate and it has the advantages of simplifying the construction and operation of machines for the purpose and of improving their action and it particularly relates to the mechanism whereby the mass-radius-length product and phase are varied and adjusted. The apparatus is applicable to balancing machines of various types but for the purpose of explanation and illustration it is shown used with a vibration frame dynamic balancing machine.

Figure 1:
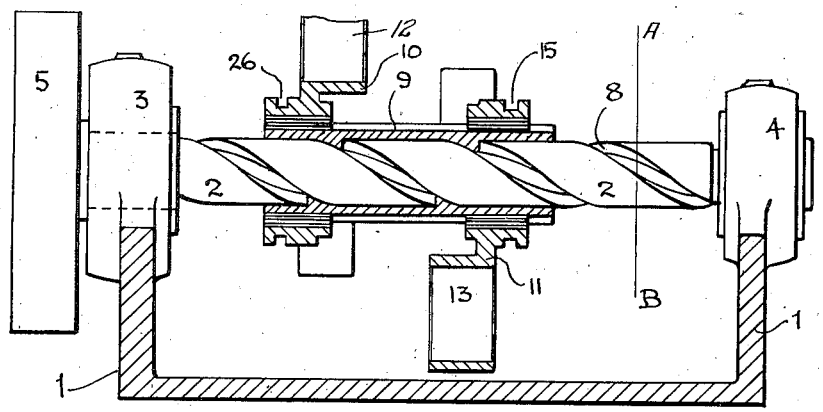
Figure 2:
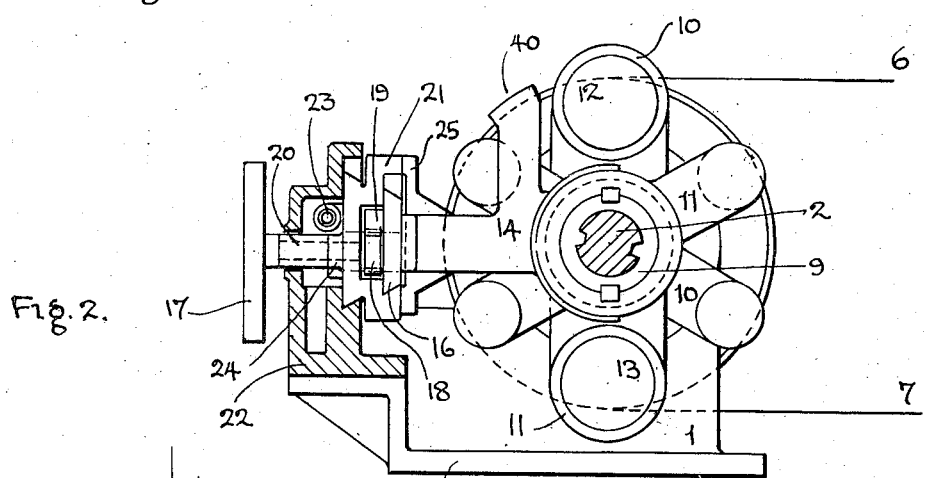
Figure 3:
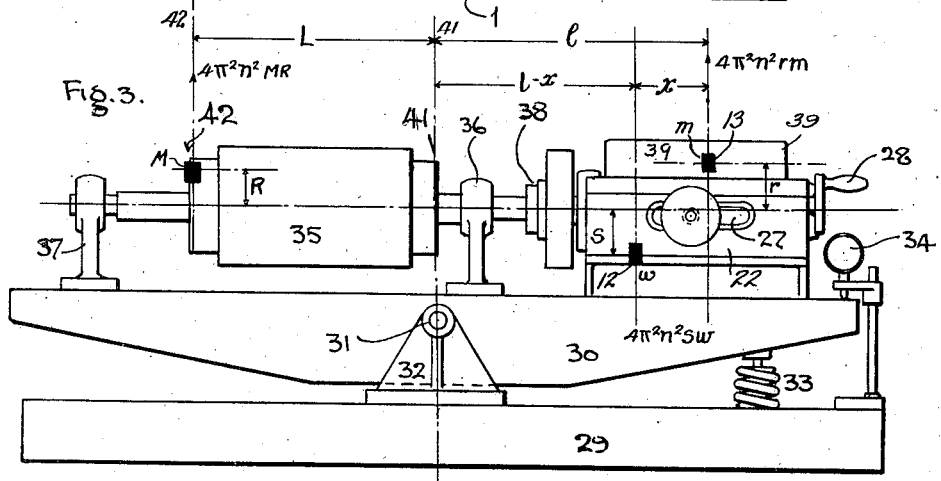

In Figure 1 is shown a sectional elevation and in Figure 2 is shown a cross-section (through the line AB in Fig. 1), of the apparatus fitted in a headstock which is shown in outside elevation as part of the balancing machine referred to above and shown in Figure 3.

As shown in Fig. 1 and in Fig. 2, the headstock 1 carries a spindle 2 in bearings 3 and 4, the spindle being fitted with a pulley 5, whereby it is driven by the belts 6 and 7. On the spindle 2 is formed a screw thread 8 of considerable angle so that the sleeve nut 9, fitted to the screw, can be moved along it easily by an axial force. More than one thread is desirable, four being a usual number, but two are shown here for clearness. The sleeve nut 9 carries a balancer 10 keyed and fixed to it or integral with it, and also a balancer 11 splined to slide along it without relative rotation. The balancers 10 and 11 are symmetrical and conveniently are bored to take masses 12 and 13 which can be changed to suit the work being done at any time. The balancers are made and fitted so that the mass-radius is the same in each but opposed in direction. The balancers may be moved axially along the spindle by any convenient means and in Fig. 2 is shown the apparatus most generally suitable. In the construction shown, the balancer 11 is moved by a fork 14 working in the groove 15 turned in the balancer and carried on a slide 16 which is operated by a hand-wheel 17 through a pinion 18 and rack 19 which is attached to the slide 16. The spindle connecting the hand-wheel 17 to the pinion 18 is carried in a sleeve 20 which forms a part of the member 21 in which the slide 16 works. The member 21 itself slides in the part 22 and its movement is controlled by the screw 23 working in the nut 24 carried by the sliding part 21. The sliding member 21 carries a second fork 25 which works in the groove 26 turned in the balancer 10 which is fixed to the sleeve nut 9.

As shown at 27 in Fig. 3, the part 22 has an elongated opening through which the pinion sleeve 20 passes and along which it moves when the sliding member 21 is moved by the screw 22, the operating handle 28 of which is shown in Fig. 3. Thus turning the handle 28 traverses the member 21 along its slide, moving the sleeve 9 and the two balancers 10 and 11 along the spindle, rotating them relatively to the spindle but not altering their distance apart axially. When the hand-wheel 17 is turned it produces no movement of the member 21 and so none of the sleeve 9 along the spindle, but moves the slide 16 and so the balancer 11 along the sleeve 9. Thus the screw controls the phase and the pinion hand-wheel the amount of the out-of-balance of the apparatus, and these are independent.

To illustrate the use of the apparatus it is shown in Fig. 3 as part of a vibration frame dynamic balancing machine consisting of a base 29 supporting a vibration frame 30 by means of bearings 31 supported by the bracket 32 and controlled by the spring 33. The movement of the vibration frame 30 about the axis 31 is shown by the indicator 34. The frame 30 carries the rotor 35 to be balanced in the bearings 36 and 37. The rotor 35 is set up so that its axis is co-linear with the axis of the spindle of the apparatus and is connected to it by a coupling 38 giving a positive drive, so that the rotor and the spindle with the running parts of the apparatus run together as one body except while the position of the balancers is being adjusted. A cover may be fitted to the headstock as shown at 39. The spindle is driven at a speed corresponding to the natural period of the vibration frame with its load or sufficiently nearly so for any lack of balance to produce effective vibration, and the drive is to be such that it produces no, or an insignificant, moment about the axis 31 of the vibration frame 30. Such is the drive indicated at 6 and 7 in Fig. 2 where the two sides of the belt lead off the pulley parallel to the axis 31.

Taking the case where the rotor is set so that one of its selected balancing planes 41 passes through the axis 31, the correction at the other balancing plane is found as follows. While the apparatus and connected rotor are running, the positions of the balancers are adjusted until the vibration frame becomes steady or sufficiently free from vibration, when the out-of-balance of the frame is neutralized by the out-of-balance set in the head. This is ascertained both as to magnitude and phase when the machine is stopped. From these observations the unknown correction of the rotor is determined in a very simple manner. Suppose the parts when in this position are as shown in Fig. 3. Let the correction which has to be found (and afterwards made) for the plane 42 of the rotor be a weight M at radius R and let the distance of the plane 42 from the pivot axis 31 be L; then when the rotor rotates at $n$ revolutions per second the "centrifugal force" is $4\pi^2 n^2 RM$, and its effect on the motion of the frame is due to its moment about the axis of the frame 31. This moment is thus $4\pi^2 n^2 RML$. The correction to be made in the plane 41 has no moment about the axis 31 for the "centrifugal force" always lies in this plane. Thus the effect of the out-of-balance of the rotor is measured by $4\pi^2 n^2 RLM$. Now consider the action of the weights in the balancing head. Let the amount of weight 13 be $m$ and that of 12 be $w$, and let them be set at the respective radii $r$ and $s$. Then their "centrifugal forces" will be $4\pi^2 n^1 mr$, $4\pi^2 n^2 ws$ respectively, and they will be in opposite directions as indicated in the figure. If the plane of $m$ be at the distance $l$ from the axis 31 its effect on the frame will be measured by its moment about this axis, namely $4\pi^2 n^2 mrl$. If the distance between the weights 12 and 13 be $x$, then the effect of the "centrifugal force" of $w$ on the frame is measured by the quantity $4\pi^2 n^2 ws(l-x)$. The combined result of the action of the two centrifugal forces of $m$ and $w$ is the difference of these, $4\pi^2 n^2 mrl$ and $4\pi^2 n^2 ws(l-x)$, and this difference is $4\pi^2 n^2 mrx$, if $w$ and $s$ are chosen so that $mr$ is the same as $ws$. These forces are in absolute units.

Now suppose that the sleeve is moved along the spindle which is done by the control without altering the relative position of the weights 12 and 13. The diagram is the same except that $l$ is altered and becomes $h$, say. The centrifugal forces are the same as before and their moments are now $4\pi^2 n^2 mrh$ and $4\pi^2 n^2 ws(h-x)$, but their difference is the same as before, namely $4\pi^2 n^2 rmx$, since $mr$ has been adjusted (in the construction of the machine) to be the same as $ws$. Thus the sleeve nut and the spaced weights carried by it can be moved along the axis without alteration to their moment about the axis of the frame, and the amount of the correction is always determined by the equation $MRL=mrx$. Thus the correction is always proportional to the separation $x$ of the balancers and does not depend upon the position of the sleeve nut along the spindle nor upon the position of the balancing head along the ways of the machine.

Suppose that in operating the machine the distance between the weights 12 and 13 were correctly set, usually they would not be in the same plane as the unbalance of the rotor in plane 42. By moving the sleeve nut along the screw the plane of the unbalance of the balancing head is turned relatively to the plane of the unbalance of the rotor and this does not alter the amount of the moment of the unbalance of the head about the axis of the frame, and thus the unbalance of the head can be adjusted rotationally until it balances the unbalance of the rotor and neutralizes its effect on the motion of the frame exactly. The phase of the out-of-balance of the rotor at plane 42 is given by the position of the sleeve along the spindle or, more simply, by turning the spindle and rotor until a mark on a balancer comes to a definite position, which is shown by a fiducial mark on an extension 40 on the forks for this purpose, when the position of the out-of-balance at plane 42 can be marked off directly or the correction made at the particular position.

With this apparatus it will be seen that both amount and phase of the correction are independently given, being controlled by the hand-wheel 17 and the handle 28 respectively while the machine is running and, as the spindle and the parts carried by it, when the adjustment has been carried out, run together with the rotor as one body in balance, without the intervention of any gearing, the result obtained will be free from inaccuracies.

When the rotor to be balanced is short it is best mounted on the spindle directly, but when it is separately supported as in the illustrative case of Fig. 3 and set up in line with the spindle the coupling 38 should be of a flexible nature. No running gearing—except in special cases—should be used to connect the spindle of the apparatus and the rotor.

While I have described and illustrated the mechanism for moving the balancers as located on the vibration frame 30, it will be apparent that such mechanism may be supported on an independent fixed member which does not participate in the vibration of the frame. Also various other changes in arrangement and design in the apparatus described above, representing a preferred embodiment of the invention, may be made without departing from the spirit of my invention.

What I claim is:—

1. In a compensating mechanism of a rotor balancing machine of the cradle type, a spindle adapted to rotate about an axis constituting an extension of the axis of the rotor member being balanced, a sleeve arranged upon said spindle, means for causing angular displacement of the sleeve by the application of longitudinal pressure to the sleeve, a pair of balancers of substantially equal but opposed mass-radius supported upon said sleeve, and means for moving one of said balancers toward and from the other balancer longitudinally of the sleeve and independently of the angular displacement of the sleeve.

2. In a compensating mechanism of a rotor balancing machine of the cradle type, a spindle adapted to rotate about an axis constituting an extension of the axis of the rotor member being balanced, a sleeve arranged upon said spindle, a spiral thread of relatively steep pitch slidably keying the sleeve to the spindle in such manner that the application of longitudinal pressure to the sleeve causes its angular displacement about the spindle, a pair of balancers of substantially equal but opposed mass-radius supported upon said sleeve and means for moving one of said balancers toward and from the other balancer longitudinally of the sleeve.

3. In a compensating mechanism of a rotor balancing machine of the cradle type, a spindle adapted to rotate about an axis constituting an extension of the axis of the rotor member being balanced, a sleeve arranged upon said spindle, a spiral thread of relatively steep pitch slidably keying the sleeve to the spindle in such manner that the application of longitudinal pressure to the sleeve causes its angular displacement about the spindle, a pair of balancers of substantially equal but opposed mass-radius supported upon said sleeve, one of said balancers being splined to the sleeve and longitudinally slidable thereon, said sleeve having a circumferential groove, and a fork freely extending into said groove and designed for imparting longitudinal pressure to the sleeve.

4. In a compensating mechanism of a rotor balancing machine of the cradle type, a spindle adapted to rotate about an axis constituting an extension of the axis of the rotor member being balanced, a sleeve arranged upon said spindle, a spiral thread of relatively steep pitch slidably keying the sleeve to the spindle in such manner that the application of longitudinal pressure to the sleeve causes its angular displacement about the spindle, a pair of balancers of substantially equal but opposed mass-radius supported upon said sleeve, one of said balancers being splined to the sleeve and longitudinally slidable thereon, said balancer having a circumferential groove, and a fork freely extending into said groove and designed for imparting longitudinal pressure to the balancer.

5. In a compensating mechanism of a rotor balancing machine of the cradle type, a spindle adapted to rotate about an axis constituting an extension of the axis of the rotor member being balanced, a sleeve arranged upon said spindle, a spiral thread of relatively steep pitch slidably keying the sleeve to the spindle in such manner that the application of longitudinal pressure to the sleeve causes its angular displacement about the spindle, a pair of balancers of substantially equal but opposed mass-radius supported upon said sleeve, one of said balancers being arranged for movement lengthwise of the sleeve by the application of longitudinal pressure thereto, and independently controlled means for applying pressure to the sleeve and to the said movable balancer.

6. In a compensating mechanism of a rotor balancing machine of the cradle type, a spindle adapted to rotate about an axis constituting an extension of the axis of the rotor member being balanced, a sleeve arranged upon said spindle, a spiral thread of relatively steep pitch slidably keying the sleeve to the spindle in such manner that the application of longitudinal pressure to the sleeve causes its angular displacement about the spindle, a pair of balancers of substantially equal but opposed mass-radius supported upon said sleeve, one of said balancers being arranged for movement lengthwise of the sleeve by the application of longitudinal pressure thereto, said sleeve and movable balancer having circumferential grooves, a fork freely extending into each of said grooves, and slidable supports for said forks, one of said slidable supports being slidably mounted upon the other slidable support.

JAMES JOHN GUEST.